United States Patent [19]

Endter

[11] 4,316,278

[45] Feb. 16, 1982

[54] SYSTEM FOR READING OR RECORDING INDICIA ON A FLEXIBLE DISC

[75] Inventor: Paul A. Endter, San Jose, Calif.

[73] Assignee: McDonnell Douglas Corporation, Long Beach, Calif.

[21] Appl. No.: 103,027

[22] Filed: Dec. 13, 1979

[51] Int. Cl.$^3$ .............................................. G11B 17/32
[52] U.S. Cl. .................................... 369/100; 369/115; 360/102; 360/103
[58] Field of Search .......................... 360/102, 103, 99; 179/100.1 G, 100.3 V, 100.41 L; 369/112, 113, 114, 115, 100, 111, 142

[56] References Cited

U.S. PATENT DOCUMENTS

| | | | |
|---|---|---|---|
| 2,863,004 | 12/1958 | Maclay | 360/103 |
| 3,166,997 | 1/1965 | Barcia | 360/102 |
| 3,818,506 | 6/1974 | Kelch | 179/100.3 V |
| 3,893,185 | 7/1975 | Ring | 360/103 |
| 3,927,252 | 12/1975 | Polley | 179/100.3 V |
| 3,980,810 | 9/1976 | Tinet | 360/103 |
| 4,003,091 | 1/1977 | Wright | 360/102 |

FOREIGN PATENT DOCUMENTS 2209981  7/1974  France ................................ 360/102

Primary Examiner—Alan Faber
Attorney, Agent, or Firm—Nilsson, Robbins, Dalgarn, Berliner, Carson & Wurst

[57] ABSTRACT

A system for reading or recording indicia on a flexible disc. The disc is rotated between a pair of surfaces, one of which is flat and the other of which is elongated and curved. The opposed flat and curved elongated surfaces stabilize the disc at a precise point therebetween to enable recording or reading of the indicia thereon. The flexible disc may be to have indicia optically carried thereon. In such applications optical means is disposed in the surfaces defining means positioned on opposite sides of the disc to record or read the optical indicia. The optical means mounted in the curved surface is offset slightly in the direction of rotation of the disc. The means defining the flat and curved surfaces are radially translated with respect to the rotating disc within a radial slot provided in a base plate over which the disc rotates. Thus, by radially translating the surfaces containing the optical means with respect to the disc, the desired indicia can be recorded or detected.

16 Claims, 6 Drawing Figures

SYSTEM FOR READING OR RECORDING INDICIA ON A FLEXIBLE DISC

BACKGROUND OF THE INVENTION

It has long been known that a rotating flexible disc used for recording or reading of indicia thereon must be stabilized at the precise point where the indicia is recorded or read. This is particularly acute when the rotating disc is a disc bearing optical signals such as video signals. With such devices, the disc must be stabilized during the specific point of reading thereby to assure that the recorded indicia is within the optical depth of field required by the optical apparatus employed.

Apparatus of the type herein involved typically utilizes a flexible disc which is rotated at a relatively high speed over a base plate or similar device and within a hydrodynamic fluid such as air. The air acts as a cushion or bearing for the rotating disc or alternatively functions as a laminar layer of air through which the disc rotates. In either instance, the disc is supported above the base plate by a layer or cushion of air and there is no particular support or plate above the rotating disc.

Various stabilization devices are known to the prior art. One such device is disclosed in French Patent 2,209,981, published July 5, 1974 for "Air Cushion Bearing for Optical Systems" in which a reading head containing a nozzle through which air is forced is maintained at a fixed distance from a rigid surface by being balanced with a mechanical force which draws the head toward the surface.

Another such device is disclosed in U.S. Pat. No. 2,905,768 which again utilizes air ejected through two sets of openings to form an air cushion bearing between a planar face on the reading head and the surface of the rotatin disc.

A further such device is shown in U.S. Pat. No. 3,166,997 wherein nozzles are spaced on each side of the rotating disc and air cushion bearings are formed by air being passed through the nozzles.

U.S. Pat. No. 3,914,541 discloses a different device in which the rotating disc is positioned above a reference surface or turntable and the reading head comprises a chamber to which is applied a reduced pressure generating an air delivery which attracts the zone of the disc located in the proximity of the nozzle.

A still further device is shown in U.S. Pat. No. 4,071,854 which employs the force of attraction of a Bernouilli force acting on the zone of the rotating disc opposite a nozzle which ejects fluid under pressure so as to attract that portion of the disc located immediately beneath the nozzle.

SUMMARY OF THE INVENTION

In accordance with the present invention, there is provided apparatus for stabilizing a rotating disc which includes first and second means which are aligned in opposed spaced apart relationship to receive the rotating disc therebetween. The first means defines a substantially flat surface which is disposed adjacent one surface of the disc and the second means defines an elongated curved surface which is disposed adjacent the other surface of the disc.

In accordance with a more specific aspect of the present invention, there is provided an optical read-record apparatus for use with a rotating disc capable of carrying optically detectable indicia representative of information which includes an arm having first and second spaced-apart aligned members for receiving the disc therebetween and having optical means mounted in said members. The first of the members defines a substantially flat surface disposed immediately adjacent one surface of the disc while the second member defines an elongated curved surface disposed immediately adjacent the opposite side of the disc. The optical means mounted in the curved surface is off-set slightly in the direction of rotation of the disc.

DETAILED DESCRIPTION OF THE INVENTION

Although as above indicated the present invention is capable of use for recording or reading of indicia representative of information with respect to a rotating disc, for purposes of ease in illustration and clarity of description the remainder of the specification will be directed specifically to the optional reading of data optically recorded on a rotating flexible disc. By such description and illustration, no limitations to the scope of the claims are to be inferred. That is, the apparatus is equally applicable to recording or detecting indicia on a rotating disc by other means such, for example, as a magnetic read-record head.

Figure 1:
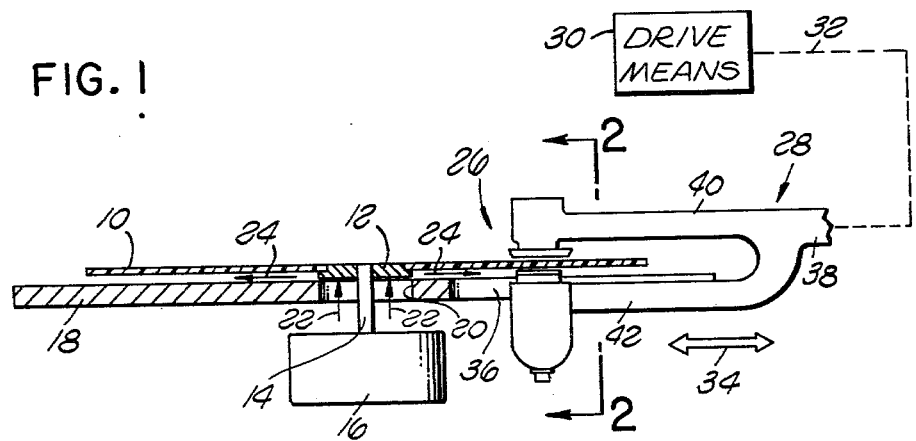
FIG. 1 is a schematic illustration of apparatus constructed in accordance with the present invention.

Referring now more specifically to FIG. 1, apparatus constructed in accordance with the present invention is schematically illustrated. As is therein shown, a flexible disc 10 is mounted upon a spindle 12 which is attached to a shaft 14 of a motor 16. As will be recognized by those skilled in the art, when the motor 16 is energized, the disc 10 is rapidly rotated since it is affixed in a non-slipping fashion to the spindle 12. It will be observed that the disc 10 is positioned above the upper surface of a base plate 18. Thus, as the disc rotates above the base plate 18, air is drawn through an opening 20 in the base plate as is illustrated by the arrows 22 so as to pass beneath the surface of the disc 10 as shown by the arrows 24, thereby to provide a cushion of air between the base plate 18 and the disc 10. The passage of the air as indicated by the arrows 22 and 24 is a self-initiating and sustaining process as is well known to those skilled in the art.

A read-record means 26 is carried by an arm 28 which is driven by a drive means 30 connected to the arm 28 as shown by dashed line 32. As the drive means is actuated, the arm 28 may be reciprocated as shown by the arrow 34 to thus move and position the read-record head radially of the rotating disc 10. A slot 36 is defined by the base plate 18 within which the read-record head 26 may be positioned and radially translated by the radial translation or drive means 30.

Figure 2:
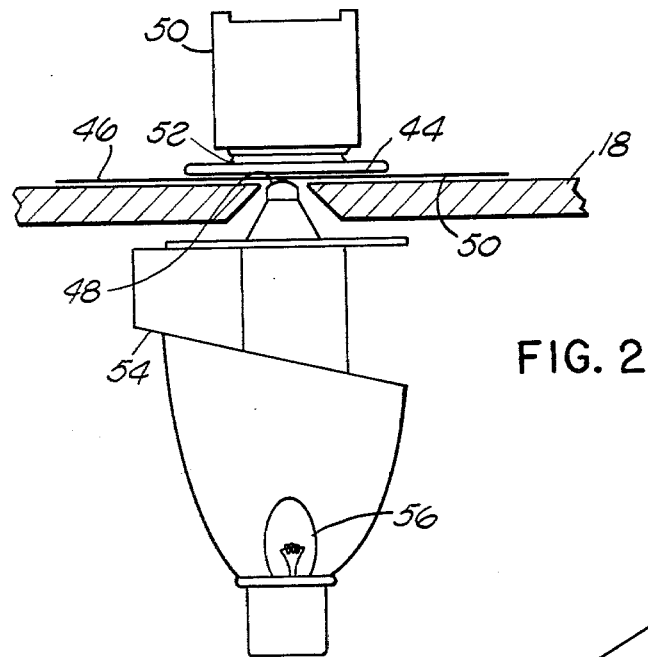
FIGS. 2 and 2A are schematic representation partly in cross-section of the device of FIG. 1 taken about the lines 2—2 of FIG. 1.
Figure 2A:
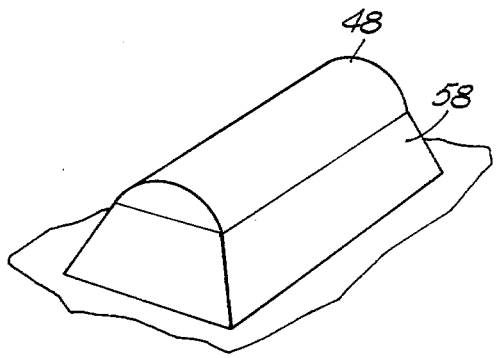

The particular relationship of the read-record head 26 to the disc 10 and the base plate 18 is more clearly shown in FIG. 2 to which reference is hereby made. As is therein shown, along with FIG. 1, the head 26 is carried upon an arm 38 from which there extends a first finger 40 and a second finger 42. The first finger 40 terminates with a flat surface 44 which is positioned adjacent the upper surface 46 of the disc 10. It should be specifically noted that the flat surface 44 although positioned immediately adjacent the disc 10 is not in engagement with it. The second finger 42 terminates in a curved surface 48 which is positioned immediately adjacent the opposite surface 50 of the rotating disc 10. Again, it will be noted that although the surface 48 is positioned immediately adjacent the surface 50 of the disc 10, it is not in engagement therewith. As is more specifically shown in FIG. 2A, the curved surface 48 is elongated and when positioned adjacent the surface of the disc 10 is positioned radially thereof.

The surface 44 is carried by a housing 50 within which there is positioned optics (not shown in FIG. 2) and which in turn supports a shoe 52 which defines the surface 44. The finger 42 also carries a housing 54 within which there is positioned optics as illustrated by the representation of a bulb 56. The housing 54 also supports a shoe 58 which defines the elongated curved surface 48. Also positioned within the housing 54, as will be recognized by those skilled in the art, are appropriate lenses and the like for concentrating the light generated by the bulb 56 to direct it to impinge upon the disc 10 as it rotates by the surface 48.

Figure 3:
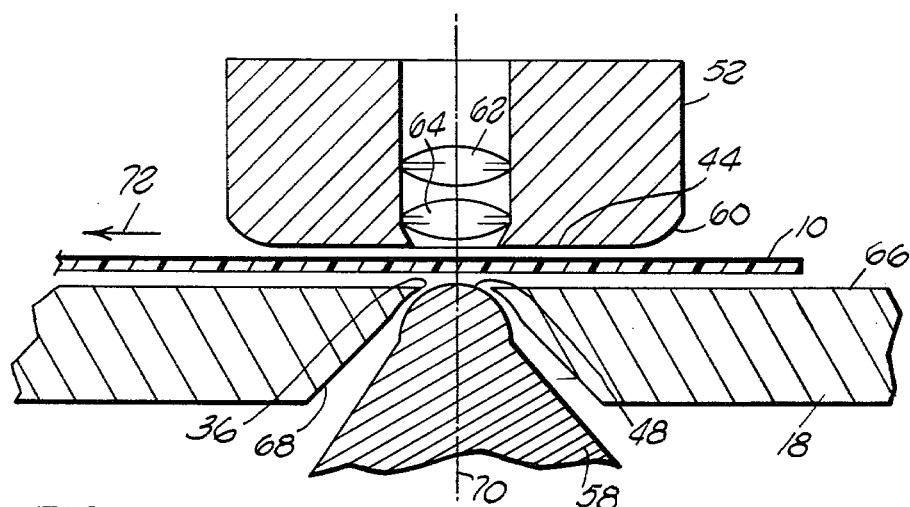
FIG. 3 is a schematic magnified representation of the apparatus shown in FIG. 2.

The relationships between the flat and elongated surfaces and the disc are more clearly illustrated in FIG. 3 to which reference is hereby made. As can be seen therein, the shoe 52 forms a flat surface 44 which is preferably circular and as is illustrated at the outer periphery thereof, the surface is upwardly turned as is shown at 60. As is illustrated, the flat surface 44 is of a diameter sufficient to be larger than the length of the elongated curved surface 48, however, it is to be understood that this size is not critical and may in fact be smaller than the surface 48. Positioned within the shoe 52 is optical means such as the lenses 62 and 64 for appropriately focusing the light transmitted through the disc from the source 56 thereof (FIG. 2).

The upper surface 66 of the base plate 18 has the radial slot 36 formed therein by the V-shaped groove 68 which extends through the entire thickness of the base plate 18. By providing the V-shaped groove 68, the shoe 58 may readily be fitted into the base plate 18 so as to appropriately position the surface 48 within the radial slot 36. By so doing, the surfaces 48 and 44 may be spaced sufficiently apart to allow the disc 10 to move therebetween without striking either of these surfaces. It has been found that if the spacing between the surfaces 44 and 48 is a distance equivalent to 0.005" greater than the thickness of the disc then sufficient space is provided. For example, if the disc 10 is 0.004 thickness, then the spacing between the surfaces 44 and 48 should be at least 0.009".

It has been found that to provide the most efficient stabilization of the disc 10 for appropriate reading of the optically recorded information contained thereon that the optical means positioned within the shoe 58 should be aligned aligned slightly off-set with respect to an imaginary plane as illustrated at 70 which is orthogonal to the disc and radial to the curved surface 48 as shown. It has been determined that this offset should be in the direction of rotation of the disc as shown by the arrow 72.

Figure 5:
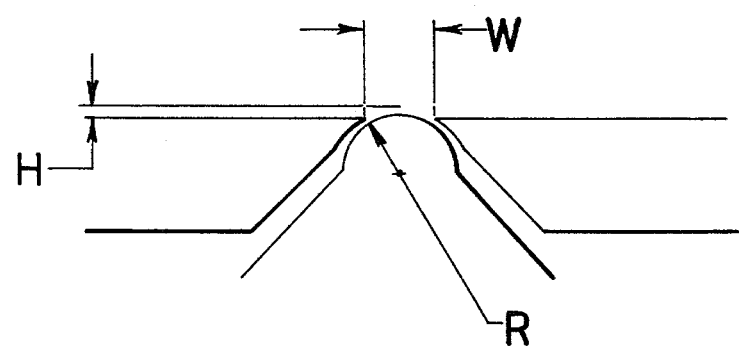

It has been determined that the insertion of the elongated curved surface 48 into the path of the rotating disc 10 causes the disc to be deformed from its original position. This deformation, taken in conjunction with the shape of the surface 48, causes self-generation of an air film between the surface 48 and the bottom surface of the disc 10. To accomplish this desired self-generation of the air film, the surface 48 must be positioned above the surface 66 of the base plate 18. It has been found that this distance should be between 0.006 and 0.020 inches and preferably at a distance of approximately 0.010 inch. This distance is illustrated in FIG. 5 by the dimension labeled H.

Obviously to provide the correct spacing the radial slot 36 must have the appropriate dimensions when taken in consideration with the radius of the surface 48. It has been found that the radius most appropriate to cause the self-generation of the desired film is between 0.1 and 0.3 inches, and it has been determined that the preferred radius is 0.187 inches. This radius is as indicated in FIG. 5 by R.

The appropriate width of the slot 36 to accommodate the elongated surface having the radius as above set forth is preferably between 0.1 and 0.23 inches.

In the preferred embodiment, the structure defining the curved surface 48 is that of a right circular cylinder, although it should be understood that other geometric configurations may provide the desired curved surface as illustrated at 48. It has been also determined that only a small portion of the surface 48 is effective and it has been determined that a sector of a right circular cylinder of at least 10 degrees is sufficient to provide the desired elongated curved surface in accordance with the principles of the present invention.

Figure 4:
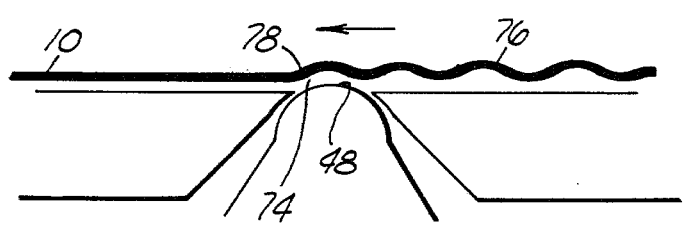
FIGS. 4 and 5 are schematic representations of a portion of the apparatus illustrated in FIG. 3 illustrating in greater detail features of the present invention.

As is further illustrated in FIG. 4, by causing the disc 10 to move past the curved surface 48 as above described, an air cushion is generated in the space 74 therebetween. This self-generated air film keeps the rotating disc suspended above the surface 48 and precludes it from coming into contact therewith. It has been found that through the utilization of the opposed surfaces 44 and 48, a positive pressure is generated upstream therefrom and a negative pressure is generated downstream thereof with a very steep pressure gradient at the apex of the curved surface 48. The point of zero pressure will be slightly downstream from the plane 70 (FIG. 3) with downstream being taken as the direction of rotation as shown by the arrow 72. Thus, by reference again to FIG. 4, it will be noted that the disc 10 is fluttering or moving as illustrated at 76. However, as it passes the apex of the surface 48 and to a point slightly downstream thereof where the zero pressure occurs, the disc 10 is most stable and this occurs, for example, at the point 78. It is at this position that the optics appearing in the surface 48 are to be positioned. It has been found that by utilizing a rotating disc 10 of approximately 4 mils in thickness and rotating at approximately 800 rpm that this distance is approximately 0.010 inches. It should be recognized that the foregoing and following preferred dimensions are all given assuming the use of a flexible disc 4 mils in thickness.

To obtain the desired functioning of the self-generated air cushion between the surface 48 and the disc 10, it has been determined that the disc 10 should be supported above the surface 66 of the base plate 18 by a height of at least 0.020 inches. In the preferred embodiment utilizing a 4 mil thick disc rotating at 1800 rpm, it has been found that the optimum distance is approximately 0.02–0.04 inches. Therefore, the spindle disc-engaging surface of the disc drive means should be spaced approximately that distance above the base plate surface 66.

There has thus been disclosed an apparatus for stabilizing a rotating disc which provides a curved surface opposed a flat surface with the disc placed therebetween and while rotating generates an air cushion having a pressure gradient across the curved surface thereby stabilizing the disc at a point of zero pressure to thus position the disc within the depth of field of a reading-recording means associated therewith.

What is claimed is:

1. Apparatus for stabilizing a rotating disc comprising:
   (a) first means for defining a substantially flat surface disposed adjacent but not in contact with one surface of said disc;
   (b) second means for defining an elongated curved surface disposed adjacent but not in contact with the other surface of said disc;
   (c) aligning means for positioning said first and second means opposed each other in spaced apart relation to receive said disc therebetween; and
   (d) optical means mounted in said first and second means for detecting and recording information containing indicia on said disc, said optical means mounted in said second means being relatively offset from a plane passing through the vertical axis of said second means orthogonal and radial to said disc in the direction of rotation of said disc while retaining optical integrity to place said optical means in said second means at a point of zero pressure differential substantially across said disc during operational rotation thereof.

2. Apparatus as defined in claim 1 wherein said offset is approximately 10 mils.

3. Apparatus as defined in claim 1 which further includes means for simultaneously moving said first and second means radially of said disc while maintaining alignment therebetween.

4. Apparatus as defined in claim 1 wherein said curved surface has a radius of curvature of between 0.1 and 0.3 inches.

5. Apparatus as defined in claim 4 wherein said second means has a length of at least one-half inch.

6. Apparatus as defined in claim 5 wherein said second means defines a surface substantially equivalent to a sector of a right circular cylinder.

7. Apparatus as defined in claim 6 wherein said sector is at least 10 degrees.

8. Apparatus as defined in claim 4 wherein said radius of curvature is approximately 0.187 inches.

9. An optical read-record apparatus for use with a rotating disc capable of carrying optically detectable indicia representative of information comprising:
   (a) an arm having first and second spaced apart aligned fingers for receiving said disc therebetween;
   (b) optical means mounted in said first and second fingers in aligned relationship for detecting and recording optical indicia on said disc as it passes between said fingers;
   (c) said first finger defining a substantially flat surface disposed immediately adjacent, but not in engagement with, one surface of said disc;
   (d) said second finger defining an elongated curved surface disposed immediately adjacent, but not in engagement with, the other surface of said disc; and
   (e) said optical means mounted in said second finger being relatively offset from a radial plane passing through the vertical axis of said curved surfaces orthogonal to said disc in the direction of rotation of said disc to place said optical means at a position of substantially zero pressure differential across said disc during operational rotation thereof.

10. Apparatus as defined in claim 9 which further includes:
    a base plate having a stationary surface;
    disc drive means including a spindle having a disc engaging surface disposed within said base plate;
    said disc engaging surface of said spindle being displaced from said stationary surface by at least 20 mils to position said disc spaced from said base plate stationary surface.

11. Apparatus as defined in claim 10 wherein said base plate defines a radial slot therein, said second finger being disposed in said slot, said curved surface being positioned above said stationary surface between 6 and 20 mils.

12. Apparatus as defined in claim 11 wherein said curved surface is positioned above said stationary surface by approximately 10 mils.

13. Apparatus as defined in claim 9 wherein said surfaces defined by said first and second means are spaced apart at least 9 mils.

14. Apparatus as defined in claim 9 wherein said flat surface is circular in configuration and has a diameter greater than the length of said curved elongated surface.

15. Apparatus as defined in claim 9 wherein said elongated curved surface is at least one-half inch in length.

16. Apparatus as defined in claim 15 wherein said curved surface is approximately one inch in length.

* * * * *